United States Patent [19]

Orona

[11] 4,043,918
[45] Aug. 23, 1977

[54] SELF CLEANING FILTER ASSEMBLY WITH FLUTTERING INNER FILTER MEMBER

[75] Inventor: Fidel Orona, El Cajon, Calif.

[73] Assignee: Reed Irrigation Systems, El Cajon, Calif.

[21] Appl. No.: 688,948

[22] Filed: May 24, 1976

[51] Int. Cl.$^2$ ............ F01D 33/00; F01D 35/20
[52] U.S. Cl. ............ 210/356; 210/359; 210/391; 210/410; 210/412; 210/DIG. 18
[58] Field of Search ............ 210/350, 354, 355, 455, 210/457, 411, 412, 497, 108, 159, 332, 333, 391, 392, 79, 81, 82, 106, 393, 407, 409, 410, 427, 433, 435, 456, 359, 356, DIG. 18; 55/293, 301, 302

[56] References Cited
U.S. PATENT DOCUMENTS

| | | | |
|---|---|---|---|
| 2,641,364 | 6/1953 | Depallens | 210/356 |
| 2,724,508 | 11/1955 | Luther | 210/356 |
| 3,019,184 | 1/1962 | Brown | 210/82 |
| 3,353,678 | 11/1967 | Dragon | 210/433 R |
| 3,409,125 | 11/1968 | Bezemer et al. | 210/412 |
| 3,421,630 | 1/1969 | Acosta | 210/411 |
| 3,431,709 | 3/1969 | Kawanami | 210/412 |
| 3,623,607 | 11/1971 | Loos | 210/355 |
| 3,794,179 | 2/1974 | Doucet | 210/409 |
| 3,890,236 | 6/1975 | Harrell | 210/457 |
| 3,891,548 | 6/1975 | Marcussen | 210/409 |

*Primary Examiner*—Frank W. Lutter
*Assistant Examiner*—Frank Sever
*Attorney, Agent, or Firm*—Owen, Wickersham & Erickson

[57] ABSTRACT

A hydraulic filter is provided with means for effectively cleaning its mesh filtering element during a flushing or "blow-down" cycle, wherein unfiltered liquid is passed rapidly along the surface of the tubular mesh to be exhausted from the filter substantially without passing through the mesh. The filter assembly includes at its inlet end a flow-restricting orifice for imparting turbulence to the liquid as it enters the interior of the tubular filtering mesh. The turbulence helps clean the mesh directly, and also tends to induce a fluttering of the mesh during blow-down, which adds to the cleaning effect. In addition, the mesh sleeve is of a somewhat tapered or frustoconical configuration which helps induce it to break away from a rigid retaining screen and helps promote fluttering during blow-down to further the cleaning action, as well as tending to deposit filtrate toward the downstream end during filtration, thereby extending the filtering cycle.

8 Claims, 3 Drawing Figures

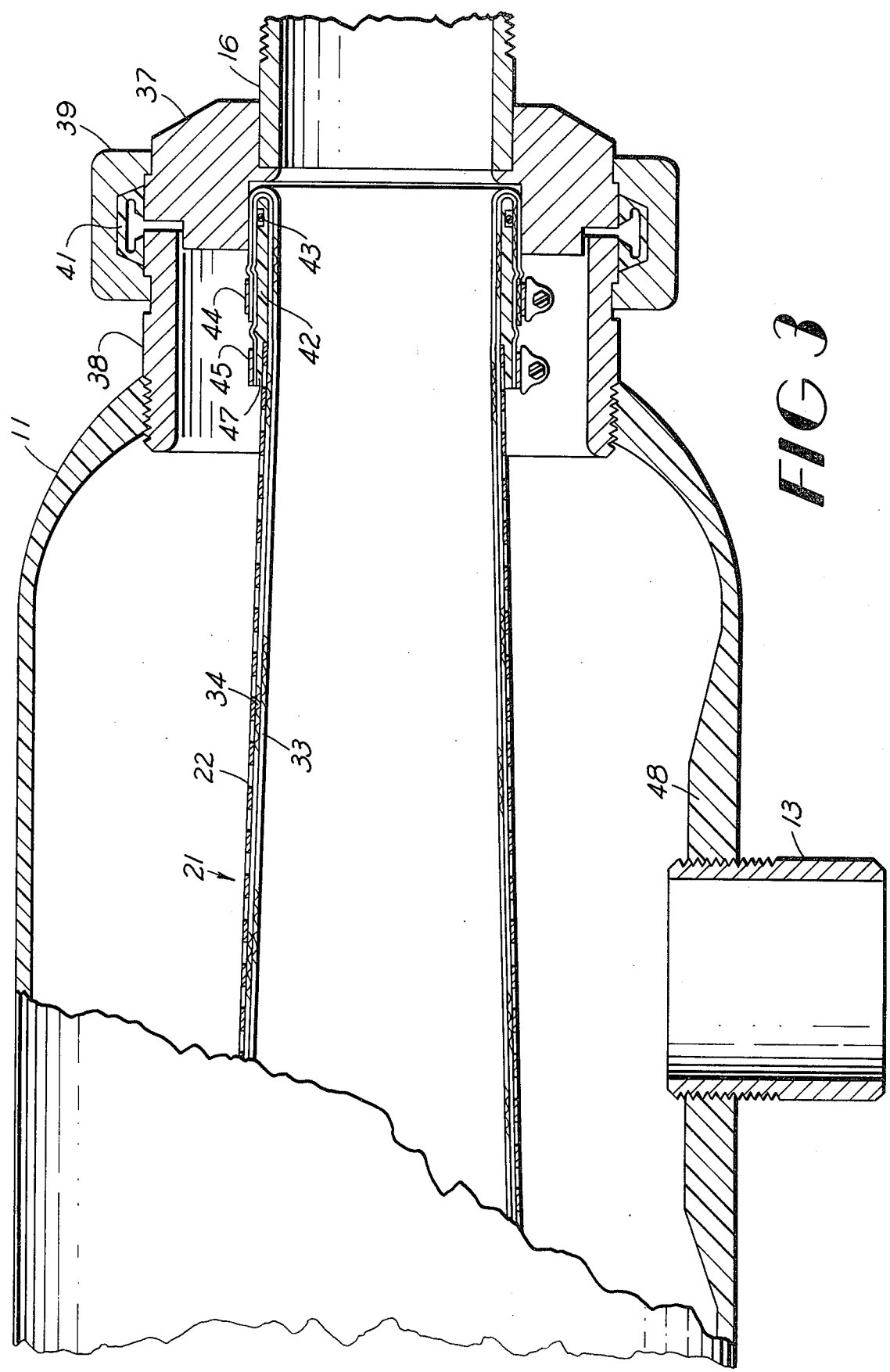

SELF CLEANING FILTER ASSEMBLY WITH FLUTTERING INNER FILTER MEMBER

BACKGROUND OF THE INVENTION

The invention relates to fluid filters, and more particularly to a liquid filter with an improved capability to be cleaned of clogging filtrate material during a washing or "blow-down" cycle.

Modern irrigation methods often require rather accurate water delivery at controlled predetermined rates to crops and even to individual plants. This has led to the development of irrigation systems having water emitters with numerous small passages which have been subject to blockage due to the presence of silt and other suspended materials in the irrigation water. To remove such particles from irrigation water prior to its flow through these small conduits, various types of filters were developed and adapted for use in irrigation systems with varying degrees of success. The filters were subjected to very large flow rates often in the hundreds of gallons per minute, and were also required to handle water from a number of sources, each with its own quantity and type of particles, including organic suspended matter. In order to reduce filter down time for cleaning, backflushing and forward flushing devices for the filter systems were introduced. Some of the flushing systems have been incorporated in cylindrical type filters wherein a filter mesh sleeve separates filtrate by radial outward flow. In such filters the mesh is cleaned by axial flow through the sleeve substantially without passing through the mesh, during a "blow-down" cycle. The heavily filtrate-laden wash water is discharged out the end of the filter assembly as waste. Usually mesh screen is retained in place in the elongated filter assembly by a more rigid sleeve immediately surrounding it.

Cylindrical filter sleeves of synthetic fiber mesh have been fairly effective in such self-cleaning filters particularly with loose sand or other fairly coarse filtrate material. However, these meshes do not clean well where materials with a tendency to cake are present such as algaes and other organic substances. When these caking filtrate materials have been deposited on the filtering surface, they have tended to hold the filtering sleeve fast against its rigid retaining screen and the passing blow-down flow has been of little effect in removing the cake from the mesh. The principal problem has been the lack of any means of disengaging the caked mesh from the rigid back-up screen so that the filtrate cake can be shaken off. This break-away must occur consistently during blow-down for there to be consistently effective cleaning.

Self-cleaning filters developed heretofore have widely varied in their cleaning effectiveness depending upon various factors such as the blow-down flow rate and the character of the materials suspended in the water. Consistency of cleaning effectiveness has thus not been achieved, greatly diminishing the filtration capability of such filters as well as causing other problems.

One such problem has been the risk of rupture of a clogged filtering sleeve. When a filter mesh is fully blocked and full line pressure is allowed to build up in the interior of the sleeve prior to cleaning or following an ineffective cleaning, a very large pressure drop occurs across the filtering mesh. If a rigid retaining sleeve is provided surrounding the mesh sleeve, the areas of large pressure drop occur at the locations of the openings in the retaining sleeve. Thus, whether or not such a restraining sleeve is provided, the mesh has tended to rupture with obvious consequences, when blow-down mesh cleaning has not been effective.

In filter assemblies equipped with these relatively rigid, usually perforated retaining sleeves around the filter mesh, the openings or perforations have been excessively small and/or few, often comprising considerably less than one-third of the total area of the retaining sleeve and leaving a correspondingly large closed area. Pressure differentials on this large closed area of the retaining sleeve when the mesh is clogged or partially clogged have consequently built up to high levels more easily. Rapid pressure fluctuations often occur which subject the sleeve to repeated localized flexing leading to fracture of the sleeve. Such a failure of course further subjects the mesh to rupture.

SUMMARY OF THE INVENTION

The filter assembly of the present invention includes means ensuring effective cleaning of filtrate from the filter mesh during blow-down, regardless of the type of suspended contaminant material present in the liquid or of wide variation in the line pressure available for blow-down.

One feature of the invention relating to improvement of cleaning capability is the provision of a turbulence imparting device near the inlet of the filter assembly to maintain a turbulent flow of liquid substantially throughout the length of the mesh sleeve interior. This device, which may be in the form of a flow-restrictive orifice or an otherwise abrupt diametral flow increase near the inlet, improves effectiveness in several ways. During filtration, it helps keep filtrate particles in suspension for a longer period of time, thereby increasing the period of time during which the filter is operative. During blow-down, the turbulence of the liquid flowing the interior length of the mesh sleeve helps agitate and remove the filtrate cake on the mesh surface. Also, in conjunction with the tapered mesh configuration discussed below, the turbulence causes the caked mesh to break away from the rigid retaining screen to which it is usually adhered by the presence of the cake, causing a fluttering of the mesh sleeve and thus a shaking off of the filtrate cake.

The filter assembly of the present invention also includes a safety back-up mesh immediately surrounding the primary filtering mesh and inside the rigid retaining sleeve. The back-up mesh is of somewhat larger mesh size and coarser fibers. This adds to the resistance of the mesh to rupture and also provides an auxiliary filter element in case a failure of any kind should occur in the inner or primary filtering mesh.

The retaining sleeve itself in the filter assembly of the invention is different in structure from those of previous filters. The sleeve is about 50% open so that when the mesh is pressed against the retaining sleeve during filtration, a greater mesh area undergoes an unrestricted flow. This not only improves the efficiency of the filter, but also helps avoid localized flexing and fracture of the retaining sleeve as discussed above, primarily by reducing the area upon which pressure differentials can act. With a high degree of turbulence within the mesh, local pressure differentials and their repeated fluctuation can be particularly acute, so that it is essential to hold the closed sleeve area to a minimum.

A very important feature of the present filter assembly is a tapered configuration of the filtering meshes and the retaining sleeve, forming an elongated, generally frustoconical shape within the filter casing. This provides significant advantages both in the filtering and in the blow-down modes. During filtering, the filter taper, in conjunction with the turbulence, helps cause particulate contaminant material to be deposited toward the outlet end of the filter. This loads the filter element progressively from the outlet end back to the inlet end, resulting in a substantially increased operative filtering capacity between blow-down cycles and thus requiring less cleaning water. During blow-down the frustoconical shape of the mesh sleeve promotes mesh fluttering substantially throughout the length of the element, in part by helping maintain the turbulence of the water flow as it progresses from the inlet end to the outlet end. Thus, substantially the full length of the element is effectively cleaned, whereas without the taper, an orifice alone will cause only about the upstream third of the element to be effectively cleaned.

The several features of the present filter assembly thus provide for efficiency of filtration and effectiveness of cleaning to an extent not previously known. It is therefore among the objects of the invention to provide a self cleaning type liquid filtration device with greatly improved performance characteristics in both the filtering and the blow-down modes, due to the influence of a number of structural improvements, both along and taken together.

Other objects, advantages and features of the invention will become apparent from the following description of a preferred embodiment.

DESCRIPTION OF THE DRAWINGS

FIG. 3 is an enlarged, partially sectional detail view of the outlet end of the filter.

DESCRIPTION OF THE PREFERRED EMBODIMENT

Figure 1:
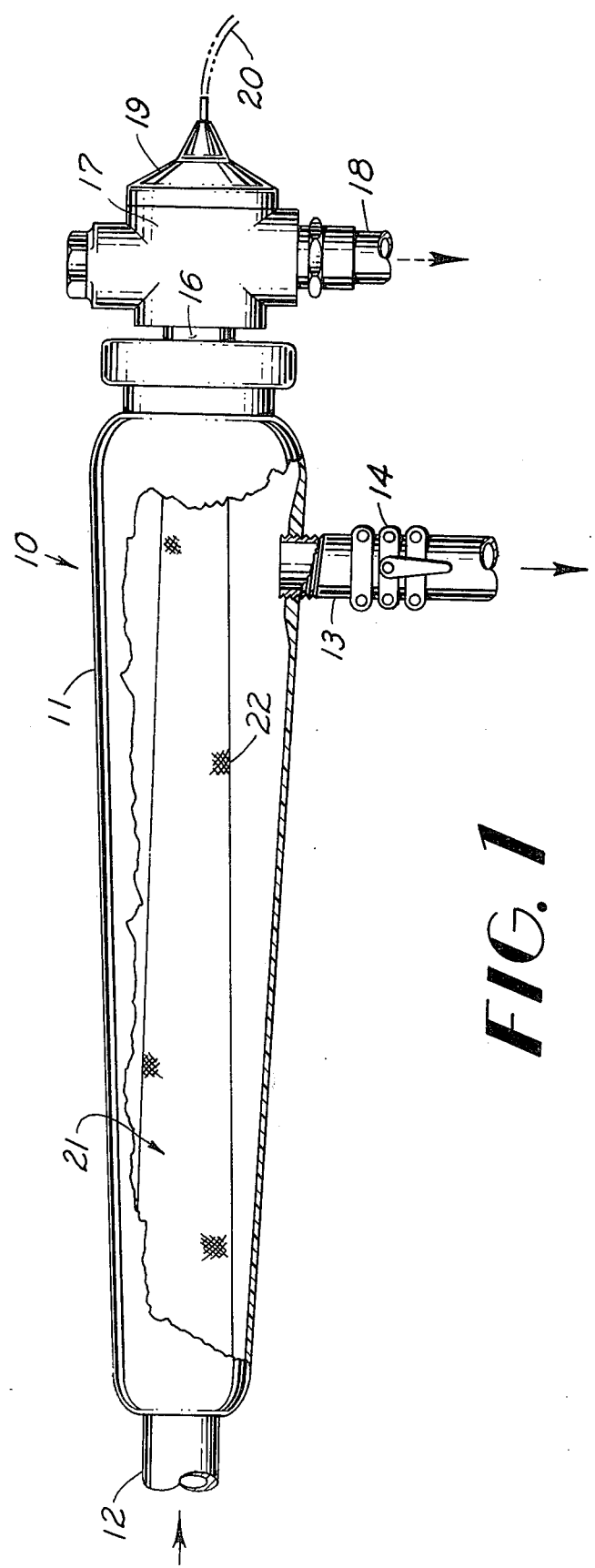
FIG. 1 is a partially broken away elevational view of a self cleaning filter according to the invention.

In the drawings, FIG. 1 shows a filter assembly 10 including an outer housing or tank 11, an inlet 12, an outlet 13 for filtered material downstream of which may be connected a valve 14, and a blow-down discharge outlet 16 connected to a blow-down valve 17 having a valve outlet 18. The blow-down valve 17 may be of a well-known type which is pilot operated via a pilot assembly 19 on the valve for connection to a pilot line 20 operable to transmit fluid pressure to the pilot assembly, the valve 17 being operable to open and close in response to fluid pressure conditions in the pilot assembly. The filter 10 may be incorporated in a system including an automatic blow-down controller as disclosed in co-pending patent application Ser. No. 675,072, now U.S. Pat. No. 4,005,013 assigned to the same assignee as the present invention, and in such case the blow-down valve 17 is open except when sufficient fluid pressure is communicated to the pilot assembly 19. In certain circumstances the outlet valve 14, shown manually-operated in FIG. 1, may be a pilot operated valve similar to the valve 17.

As shown in a broken away portion of FIG. 1, a tapered filtering member 21 extends from the inlet 12 to the outlet 16, preferably with the smaller diameter toward the outlet. The member 21 includes several concentrically arranged components as will be seen below, the outer component 22 visible in FIG. 1 being a relatively rigid perforated retaining screen of mesh or other structure having openings.

Figure 2:
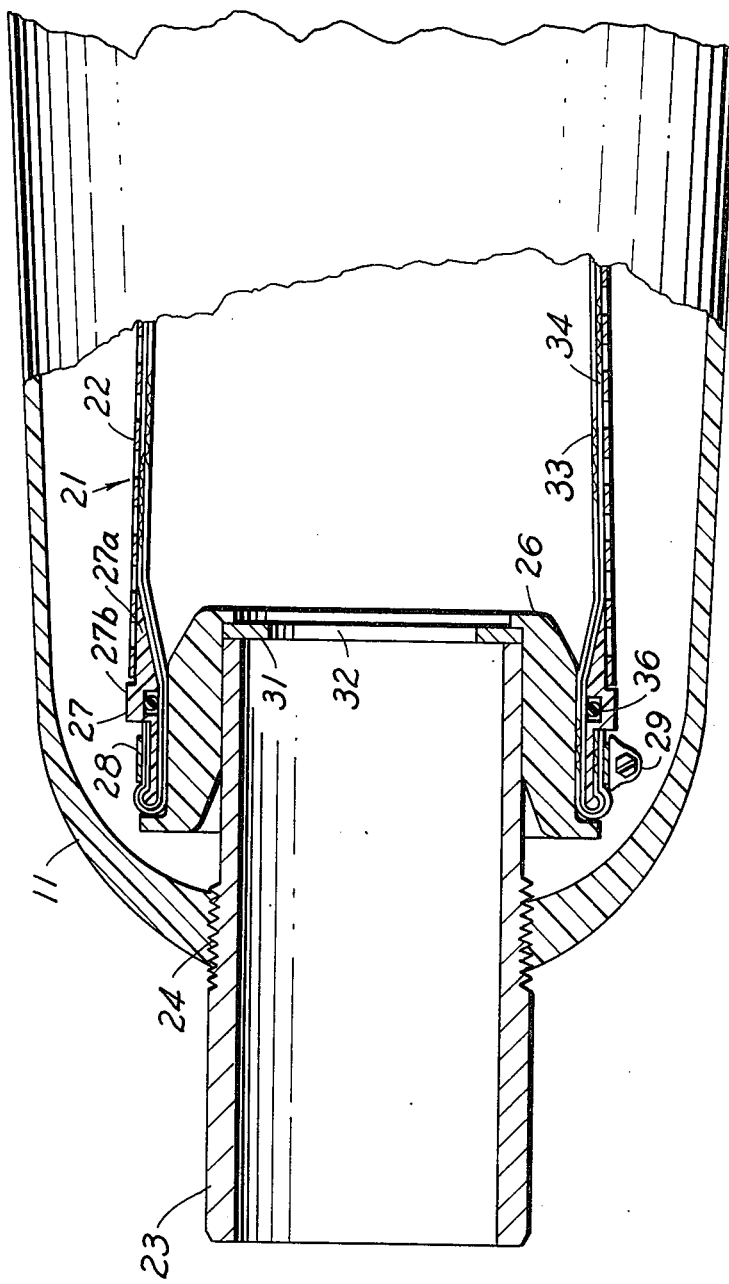
FIG. 2 is an enlarged partially sectioned detail view of the inlet end of the filter.

FIGS. 2 and 3 show in detail the inlet and outlet ends of the filter assembly 10 and the structure of the filtering member 21. The inlet 12 includes a tubular fitting 23 sealingly engaged in the end of the tank 11 preferably by screw threads 24 as shown, an annular support collar 26 fitted onto and preferably cemented to the inner end of the fitting 23, an annular fitting 27 over the support collar 26 for retaining the components of the filtering member 21, and a clamping ring 28. As indicated the clamping ring 28 may include a wrench-engageable hose clamp type tightener 29 which may include screw threads for drawing the clamp ring tightly circumjacent the fitting 27. Engaged between the support collar 26 and the inner end of the inlet fitting 23 is an annular orifice plate 31 having a central sharp-edged opening 32 of a diameter somewhat smaller than that of the inlet fitting 23 and substantially smaller than the inside diameter of the filtering member 21 at the inlet end. As discussed above, this induces a turbulence into the flow of the inlet liquid as it enters the interior of the filtering member 21, so that the particles are held in suspension for a longer period during the filtration cycle and cleaning of the filter is more effective during the blow-down cycle.

For optimum turbulence formation, it has been found that the inside diameter of the inlet fitting 23 should be about 1.2 to 2.5 times the size of the orifice. Although an orifice such as that formed by the plate 31 is preferred, any inlet device which produces an abrupt increase in flow diameter near the inlet end of the filtering member 21 will produce some fluid turbulence. For example, the inside diameter of the entire inlet fitting 23 could be made smaller, with the elimination of the orifice plate 31, providing an abrupt diametral increase as liquid exits the fitting 23. For systems with relatively high flow capacity, it has been found that the orifice plate 31 can be eliminated, with the relative dimensions of the fitting 23 and the member 21 unchanged, since greater turbulence is caused at the diametral increase with greater flow. In fact, it is desirable to eliminate the orifice in the case of extreme flow rates, since violent water agitation may cause undue wear of the filtering member 21.

As indicated in FIGS. 2 and 3, the filtering member 21 preferably includes three separate concentrically oriented components, the outer of which is the retaining sleeve 22. The sleeve 22 is relatively rigid for supporting the length of the filtering member and may be formed of a corrosion and rust resistant metallic alloy such as stainless steel. It has openings or perforations which preferably comprise about 50% of its total area for promoting efficient filtration and avoiding damage to the sleeve 22 as discussed above. The perforations may be formed by cutting openings in a sheet of material or the sleeve may comprise a suitably sized wire mesh. At the inlet end of the filter, the retaining sleeve 22 is affixed, preferably by adhesive, to a downstream extension 27a of the fitting 27 contoured to fit the sleeve 22 as shown.

Concentrically positioned within the retaining sleeve 22, but not retained thereto, are a pair of flexible mesh sleeves 33 and 34. Both sleeves 33 and 34 are adapted to flutter as described above when the turbulent blow-down flow passes through the interior. The innermost mesh 33 is the primary filtering element of the filter 10 and preferably comprise a synthetic fiber cloth of mesh size suitable for removing contaminants of all sizes capable of causing trouble in the system being served. The adjacent mesh 34, between the primary mesh 33 and the retaining sleeve 22, may be of similar material but is preferably somewhat coarser in fiber and larger in mesh size. This mesh merely serves as a back-up safety mesh to provide filtration if the primary mesh should rupture or develop leaks for any reason; the primary mesh 33 will operate advantageously during filtration and blow-down without the back-up mesh 34. Both the primary and the back-up meshes 33 and 34 separate from the retaining sleeve 22 at the inlet end, passing between the collar fitting 27 and the support collar 26, then being folded around the end of the fitting 27 as shown and engaged by the clamp ring 28. An O-ring 36 may be provided between the meshes and an offset portion 27b of the fitting 27 to tightly engage the meshes against the support collar 26 when the fitting 27 is assembled thereon, preventing leakage of fluid without filtration. O-ring contact with the collar 26 is thereby avoided, preventing sticking problems often encountered with prior filter constructions.

As noted above, the filter mesh sleeves 33 and 34, as well as the retaining sleeve 22, are preferably frustoconical in shape. This shape is very important, as discussed above, in that it helps cause the meshes to break away from the retaining sleeve during blow-down, it helps carry the fluttering motion of the meshes through their entire length for optimum cleaning, and it helps cause filtrate deposit to occur from the downstream end back. The optimum and preferred diameter difference between the ends of the filtering member 21 has been found to be 2% to 20% of the sleeve's length. The illustrated orientation of the tapered elements, with the large end at the inlet, is preferred, although it has been determined that the flutter effect is obtained also with the opposite orientation.

FIG. 3 shows the downstream end of the filter assembly 10 in detail. The blow-down outlet 16 is a conduit threaded for connection to the blow-down valve 17 shown in FIG. 1, and affixed at its upstream end to an adapter fitting 37. A complementary tank collar 38 is screw threaded into the downstream, larger end of the filter tank 11. Sealingly connecting the two as shown is a pipe coupling 39 including a compressible, resilient sealing member 41 which forms a ring of sealed contact with each of the components 37 and 38. The coupling 39 may comprise two C-shaped pieces (not shown) held together by suitable clamping means. Thus, the coupling is removable so that the fitting 37 can be separated from the fitting 38 for removal of the filtering member 21, as will be further explained below.

At this end of the filter the interior of the filtering member 21 is approximately the internal diameter of the blow-down outlet 16. An annular filter member support fitting 42 is sized to fit into the adapter fitting 37 with very little clearance. The meshes 33 and 34, which wrap around the fitting 42 as shown, lie between the fitting 42 and the surrounding adapter fitting 37, forming a press-fit connection. An O-ring 43 is compressed between the support fitting 42 and meshes 33 and 34 to prevent leakage of unfiltered liquid at this end. Contact of the O-ring with the fitting 37 is thus avoided. Clamping rings 44 and 45 may be included to tightly retain the meshes to the support fitting 42. Similarly to the inlet end, the rigid retaining sleeve 22 is connected to an extending leg 47 of the support fitting 42, preferably by adhesive.

If servicing is required within the filter tank 11, the coupling 39 is removed and the adapter fitting 37 is pulled off the support fitting 42, whereupon the assembly including the support fitting 42, the filtering member 21 and the various connectors at the inlet end may be pulled off the support collar 26 and removed through the outlet end of the filter tank, without removal of the tank collar 38.

As also seen in FIG. 3, the filtered liquid outlet 13 of the filter 10 preferably is threaded through a thickened portion 48 of the bottom side of the filter tank 11.

The above described preferred embodiment provides a self-cleaning type filter assembly which is efficient in filtration and highly effective in cleaning itself of clogging filtrate materials during blow-down, as well as being relatively simple in construction and easily dismantled. Various other embodiments will be apparent to those skilled in the art and may be made without departing from the spirit and scope of the following claims.

I claim:
1. A self cleaning filter comprising:
an elongated tubular housing having an inlet and a first outlet at its opposite ends;
a central generally tubular filtering element extending between said inlet and said first outlet within said housing, said element including a flexible inner filtering member having a multiplicity of openings and surrounded by a relatively rigid apertured sleeve member;
said filtering element having a diameter less than said housing and retained therein to form an annular space around said element;
a second outlet for filtered liquid located in the sidewall of said housing;
said flexible inner filtering member being of a generally frustoconical shape functioning to flutter in response to liquid flowing through said first outlet;
whereby said filter may be cleaned when liquid is allowed to flow through said first outlet, and said filter normally operates to provide filtered liquid through said second outlet.

2. The self cleaning filter of claim 1 wherein the central filtering element has its larger end at the inlet end of the filter housing.

3. The self cleaning filter of claim 2 which further includes a flow-restrictive orifice adjacent to the inlet for imparting turbulence to the incoming liquid to augment fluttering of the inner filtering member during cleaning.

4. The self cleaning filter of claim 3, wherein said inlet has a flow diameter of from about 1.2 to 2.5 times the diameter of the flow-restrictive orifice.

5. The self cleaning filter of claim 2 wherein the difference between the two end diameters of the central filtering element is from about 2 to about 20 percent of the length of the central filtering element.

6. The self cleaning filter of claim 2 wherein said central filtering element further includes a second flexible member having larger openings than said flexible inner filtering member and positioned in surrounding relationship to said inner member, interposed between the inner member and said perforated sleeve member.

7. The self cleaning filter of claim 2 wherein said housing inlet includes a tubular fitting extending into the housing, an annular support collar on said fitting interior of the housing, the end of said flexible inner filtering member being positioned over the support collar, and an annular mounting member engaged circumjacent the end of the filtering member, engaging the end of the filtering member against the support collar.

8. The self cleaning filter of claim 7 wherein an annular resilient sealing member is compressed between a recess of said annular mounting member and the end of said flexible inner filtering member to press the end of the filtering member against the support collar.

* * * * *